(12) United States Patent
Chao et al.

(10) Patent No.: US 11,290,151 B1
(45) Date of Patent: Mar. 29, 2022

(54) DIAGNOSING METHOD AND DIAGNOSING DEVICE FOR ABNORMAL CABLE CONNECTION OF INCREMENTAL ENCODER

(71) Applicant: Delta Electronics, Inc., Taoyuan (TW)

(72) Inventors: Kuo-Heng Chao, Taoyuan (TW); Tsung-En Pai, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 17/385,308

(22) Filed: Jul. 26, 2021

(30) Foreign Application Priority Data

Jan. 28, 2021 (CN) .......................... 202110118387.0

(51) Int. Cl.
*H04B 3/46* (2015.01)
(52) U.S. Cl.
CPC ....................................... *H04B 3/46* (2013.01)
(58) Field of Classification Search
CPC ................................ G01D 5/2451; H04B 3/46
See application file for complete search history.

(56) References Cited

U.S. PATENT DOCUMENTS

| | | | | |
|---|---|---|---|---|
| 5,594,241 A * | 1/1997 | Li | ........................ | G01D 5/2448 250/231.14 |
| 7,104,119 B1 * | 9/2006 | Trapasso | .............. | G01D 5/2451 73/114.26 |
| 2008/0084171 A1 * | 4/2008 | Leehey | ................. | G05B 19/414 318/34 |
| 2010/0072939 A1 * | 3/2010 | Liu | ....................... | G01D 5/2451 318/656 |
| 2015/0263659 A1 * | 9/2015 | Chi | ......................... | G01P 3/489 318/461 |

* cited by examiner

*Primary Examiner* — Khanh C Tran
(74) *Attorney, Agent, or Firm* — Chun-Ming Shih; HDLS IPR Services

(57) ABSTRACT

A diagnosing method for an abnormal cable connection of an incremental encoder includes: receiving a first-set of differential signals including one of signals A/Ā and one of signals B/B̄ and a second-set of differential signals including one of signals A/Ā and one of signals B/B̄ from the incremental encoder by two encoder modules; calculating a first signal-information group and a second signal-information group according to the first-set and second-set of differential signals; calculating a first parameter-information group and a second parameter-information group based on the first and second signal-information groups; determining whether a first signal direction is consistent with a second signal direction according to the first and second parameter-information groups; calculating a position-feedback control parameter for a motor according to a signal-information group corresponding to a normal set of differential signals when the first signal direction is determined to be inconsistent with the second signal direction.

10 Claims, 12 Drawing Sheets

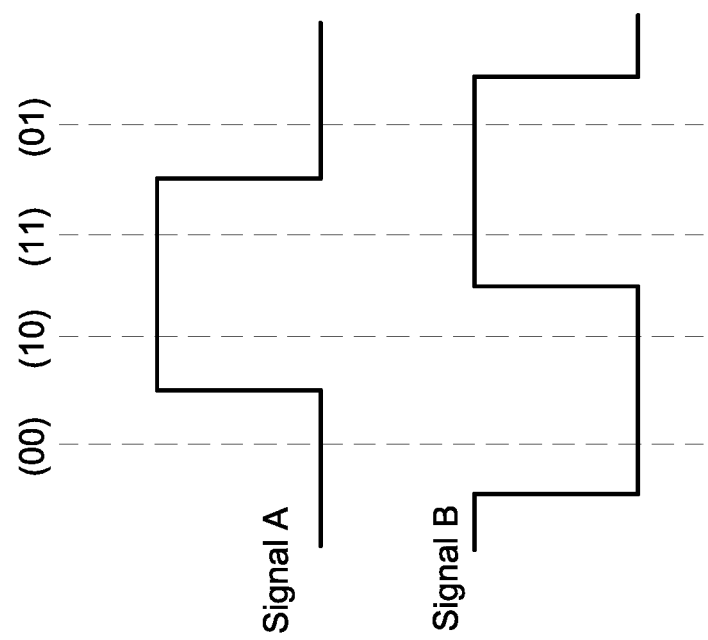

DIAGNOSING METHOD AND DIAGNOSING DEVICE FOR ABNORMAL CABLE CONNECTION OF INCREMENTAL ENCODER

BACKGROUND OF THE DISCLOSURE

Technical Field

The present disclosure relates to a diagnosing method and a diagnosing device of an incremental encoder, and specifically relates to a diagnosing method and a diagnosing device used to diagnose an abnormal cable connection of an external cable of the incremental encoder corresponding to a motor.

Description of Related Art

The application of the electric vehicle powertrain in the market usually uses a motor to drive. In consideration of control performance of the electric vehicle, the motor usually uses a controlling architecture capable of position-feedback when performing a field-oriented control (FOC). In this case, the signal accuracy of an encoder of the motor may directly affect the control performance of the motor, which is really matter.

The most commonly used electric vehicles in related art implement motor position-feedback control through an incremental encoder. Please refer to FIG. 1, which is a schematic diagram of a motor driver in related art.

As shown in FIG. 1, an incremental encoder 11 outputs an A phase differential signals and a B phase differential signals, which include a signal A, a signal $\overline{A}$, a signal B, and a signal $\overline{B}$. A motor driver 12 receives two sets of differential signals respectively through two differential line receivers 121 inside the motor driver 12, wherein one of the two differential line receivers 121 receives the signal A and the signal $\overline{A}$, the other one of the two differential line receivers 121 receives the signal B and the signal $\overline{B}$. The motor driver 12 filters noises from the received two sets of differential signals to generate two sets of single-ended signal. In the diagram shown in FIG. 1, the two sets of single-ended signal are represented as a PGA signal and a PGB signal.

As shown in FIG. 1, the motor driver 12 also receives the two sets of differential signals respectively through two XOR logic circuits 122 inside the motor driver 12, wherein one of the two XOR logic circuits 122 receives the signal A and the signal $\overline{A}$, the other one of the two XOR logic circuits 122 receives the signal B and the signal $\overline{B}$. Therefore, the motor driver 12 performs a disconnection detection through the two XOR logic circuits 122, and generates two corresponding error signals PGLoss respectively. In FIG. 1, the two error signals are represented as two PGLoss signals.

Next, the motor driver 12 transmits the two sets of single-ended signal (a PGA signal and a PGB signal) to an encoder module 131 inside a micro control unit (MCU) 13, and the encoder module 131 may compute a signal count information and a signal direction information based on a comparing result of the two sets of single-ended signal. More specific, the MCU 13 may compute a direction, an angle, and a rotating speed of the motor in accordance with the above computed information, so as to compute a position-feedback control parameter of the motor in order to control the motor.

In the aforementioned controlling architecture, the motor driver 12 needs to arrange the two differential line receives 121 and the two XOR logic circuits 122 additionally, which increases the cost of production. Besides, when detecting an abnormal status, such as a poor contact of the output circuit, a disconnection, a short circuit, a signal interference, etc., to the differential signals outputted from the incremental encoder 11 of the controlling architecture such that the abnormal status may cause an error to the motor or cause the motor to stop rotating, and damage a machine which incorporated with the motor (for example, it may cause a high-speed driving electric vehicle to stop suddenly).

Accordingly, the controlling architecture for diagnosis of related art needs to be further improved.

SUMMARY OF THE DISCLOSURE

The present disclosure is directed to a diagnosing method and a diagnosing device for an abnormal cable connection of an incremental encoder, which may detect an abnormal cable connection of the incremental encoder in real-time, and provide a redundant signal output when the abnormal cable connection is detected.

In one of the exemplary embodiments, the diagnosing method of the present disclosure is incorporated with a motor driver connected with an incremental encoder and a motor, the motor driver at least includes a micro control unit (MCU) having a first encoder module and a second encoder module, the incremental encoder outputs a signal A, a signal $\overline{A}$, a signal B, and a signal $\overline{B}$, wherein the signal $\overline{A}$ is a reverse signal of the signal A, the signal $\overline{B}$ is a reverse signal of the signal B, and the diagnosing method includes following steps:

computing, by the first encoder module, a first signal information group in accordance with a first set of differential signals, wherein the first set of differential signals includes one of the signal A and the signal $\overline{A}$ and one of the signal B and the signal $\overline{B}$, and the first signal information group includes a first signal count and a first signal direction;

computing, by the second encoder module, a second signal information group in accordance with a second set of differential signals, wherein the second set of differential signals includes one of the signal A and the signal $\overline{A}$ and one of the signal B and the signal $\overline{B}$, and the second signal information group includes a second signal count and a second signal direction;

computing, by the MCU, a first parameter information group based on the first signal information group and a second parameter information group based on the second signal information group, wherein the first parameter information group includes a first signal rotating speed, a first signal angle, and the first signal direction, the second parameter information group includes a second signal rotating speed, a second signal angle, and the second signal direction;

determining, by the MCU, whether the first signal direction is consistent with the second signal direction; determining, by the MCU, that multiple external cables connected between the incremental encoder and the motor driver are normal when the first signal direction is consistent with the second signal direction, and computing, by the MCU, a position-feedback control parameter of the motor in accordance with the first signal information group generated based on the first set of differential signals or the second signal information group generated based on the second set of differential signals;

executing following steps by the MCU when the first signal direction is inconsistent with the second signal direction:

(1) computing a first signal acceleration in accordance with the first signal rotating speed and determining whether the first signal acceleration is greater than an acceleration threshold, when the first signal acceleration is greater than the acceleration threshold, determining that at least one differential signal received by the first encoder module is abnormal and computing the position-feedback control parameter of the motor in accordance with the second signal information group generated based on the second set of differential signals;

(2) computing a second signal acceleration in accordance with the second signal rotating speed and determining whether the second signal acceleration is greater than the acceleration threshold, when the second signal acceleration is greater than the acceleration threshold, determining that at least one differential signal received by the second encoder module is abnormal and computing the position-feedback control parameter of the motor in accordance with the first signal information group generated based on the first set of differential signals; and (3) determining that a situation of an abnormal speed-feedback signal occurs and terminating a diagnosis when the first signal direction is inconsistent with the second signal direction, the first signal acceleration is not greater than the acceleration threshold, and the second signal acceleration is not greater than the acceleration threshold.

In one of the exemplary embodiments, the diagnosing device of the present disclosure at least includes a motor driver comprising a micro control unit (MCU) connected with an incremental encoder and a motor, the incremental encoder outputs a signal A, a signal $\overline{A}$, a signal B, and a signal $\overline{B}$, and the incremental encoder provides the signal A, the signal $\overline{A}$, the signal B, and the signal $\overline{B}$ to the motor driver through a first path, a second path, a third path and a fourth path in the motor driver, wherein a first resistor is connected between the first path and the second path, a second resistor is connected between the third path and the fourth path, the signal $\overline{A}$ is a reverse signal of the signal A, the signal $\overline{B}$ is a reverse signal of the signal B, and the MCU includes:

a first encoder module having two inputs respectively connected with the first path and the third path, and computing a first signal information group in accordance with a first set of differential signals, wherein the first set of differential signals includes one of the signal A and the signal $\overline{A}$ and one of the signal B and the signal $\overline{B}$ received through the first path and the third path, and the first signal information group includes a first signal count and a first signal direction;

a second encoder module having two inputs respectively connected with the second path and the fourth path, and computing a second signal information group in accordance with a second set of differential signals, wherein the second set of differential signals includes one of the signal A and the signal $\overline{A}$ and one of the signal B and the signal $\overline{B}$ received through the second path and the fourth path, and the second signal information group includes a second signal count and a second signal direction; and a diagnosing unit, receiving the first signal information group from an output of the first encoder module and receiving the second signal information group from an output of the second encoder module, wherein the diagnosing unit is configured to compute a first parameter information group based on the first signal information group and compute a second parameter information group based on the second signal information group, wherein the first parameter information group includes a first signal rotating speed, a first signal angle, and the first signal direction, the second parameter information group includes a second signal rotating speed, a second signal angle, and the second signal direction;

wherein, the diagnosing unit is configured to determine that at least one of multiple external cables connected between the incremental encoder and the motor driver is abnormal or determine that a situation of an abnormal speed-feedback signal occurs to the motor in accordance with the first parameter information group and the second parameter information group, and the diagnosing unit is configured to compute a position-feedback control parameter of the motor in accordance with the first signal information group generated based on the first set of differential signals or the second signal information group generated based on the second set of differential signals transmitted through a normal one of the multiple external cables.

In comparison with related art, the present disclosure uses two encoder modules of an MCU to determine whether the two sets of differential signals have a consistent direction. Therefore, the present disclosure may detect whether multiple external cables of the incremental encoder connected to the motor driver are abnormal without arranging an additional hardware. Also, when one of the multiple external cables connected to the incremental encoder is determined to be abnormal, the present disclosure may perform a redundant operation for the motor to keep rotating based on a normal set of differential signals, so as to prevent the motor from downtime. As a result, the robustness and practicality of an electric vehicle incorporated with the motor may be improved, and the electric vehicle may causing a vital dangerous due to the losing of power during high-speed driving.

DESCRIPTION OF THE DRAWINGS

FIG. 4A is a schematic diagram showing a signal count of a first embodiment according to the present disclosure.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses a diagnosing device for an abnormal cable connection of an incremental encoder (referred to as a diagnosing device hereinafter), in one embodiment, the diagnosing device includes a motor driver with modified internal circuits. More specific, the diagnosing device may be implemented by a micro control unit (MCU) in the motor driver.

Figure 2:
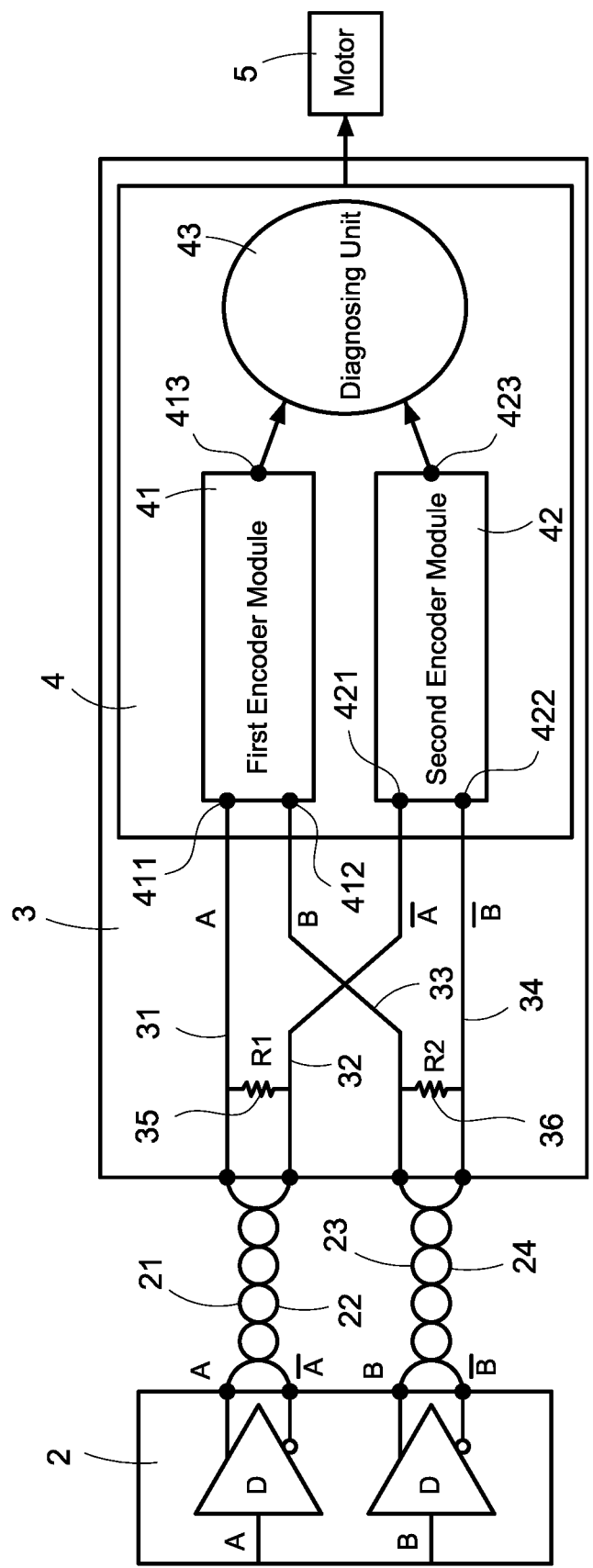
FIG. 2 is a schematic diagram of a motor driver of a first embodiment according to the present disclosure.

Please refer to FIG. 2, which is a schematic diagram of a motor driver of a first embodiment according to the present disclosure. FIG. 2 discloses a motor driver 3, the motor driver 3 includes an input electrically connected with an output of an incremental encoder 2 through multiple external cables, and the motor driver 3 receives multiple sets of differential signals outputted from the incremental encoder 2 through the multiple external cables. Also, the motor driver 3 includes an output electrically connected with a motor 5, so the motor driver 3 controls the rotation of the motor 5 in accordance with computed parameters, such as rotating speeds, angles, directions, etc.

As shown in FIG. 2, the motor driver 3 at least includes a micro control unit (MCU) 4, the MCU 4 at least includes two encoder modules. FIG. 2 shows a first encoder module 41 and a second encoder module 42 as an example, but the amount of the encoder modules is not limited to two. Also, the MCU 4 may run a diagnosing unit 43, the diagnosing unit 43 may be implemented by firmware or a physical circuit.

One technical feature of the present disclosure is that the MCU 4 receives the differential signals from the incremental encoder 2, and then analyzes the received differential signals through the diagnosing unit 43, so as to determine whether the multiple external cables connected between the output of the incremental encoder 2 and the input of the motor driver 3 includes an abnormal cable (namely, an abnormal situation such as a disconnection, a short circuit, an interference, etc., occurs to any of the external cables). Through analyzing the differential signals from the output of the incremental encoder 2, the technical solution of the present disclosure may detect an abnormal cable between the output of the incremental encoder 2 and the input of the motor driver 3 in real-time.

The present disclosure uses the first encoder module 41 and the second encoder module 42 to respectively process two sets of differential signals outputted from the incremental encoder 2, when one of the two sets of differential signals received by the MCU 4 is abnormal due to an abnormal cable of the output of the incremental encoder 2 and the input of the motor driver 3, the MCU 4 may control the motor 5 to keep rotating through another set of the two sets of differential signals which is a normal set of differential signals. Therefore, the MCU 4 may prevent the motor 5 from downtime. If an electric vehicle incorporated with the diagnosing system of the present disclosure (i.e., having the modified motor driver 3), the robustness and practicality of the electric vehicle may be improved, and the electric vehicle may be prevented from causing a vital dangerous due to the losing of power during high-speed driving.

In one embodiment, the first encoder module 41 and the second encoder module 42 are quadrature encoder pulse (QEP) modules, wherein an output signal of the first encoder module 41 may be represented as a QEPA signal, an output signal of the second encoder module 42 may be represented as a QEPB signal, but not limited.

Figure 3:
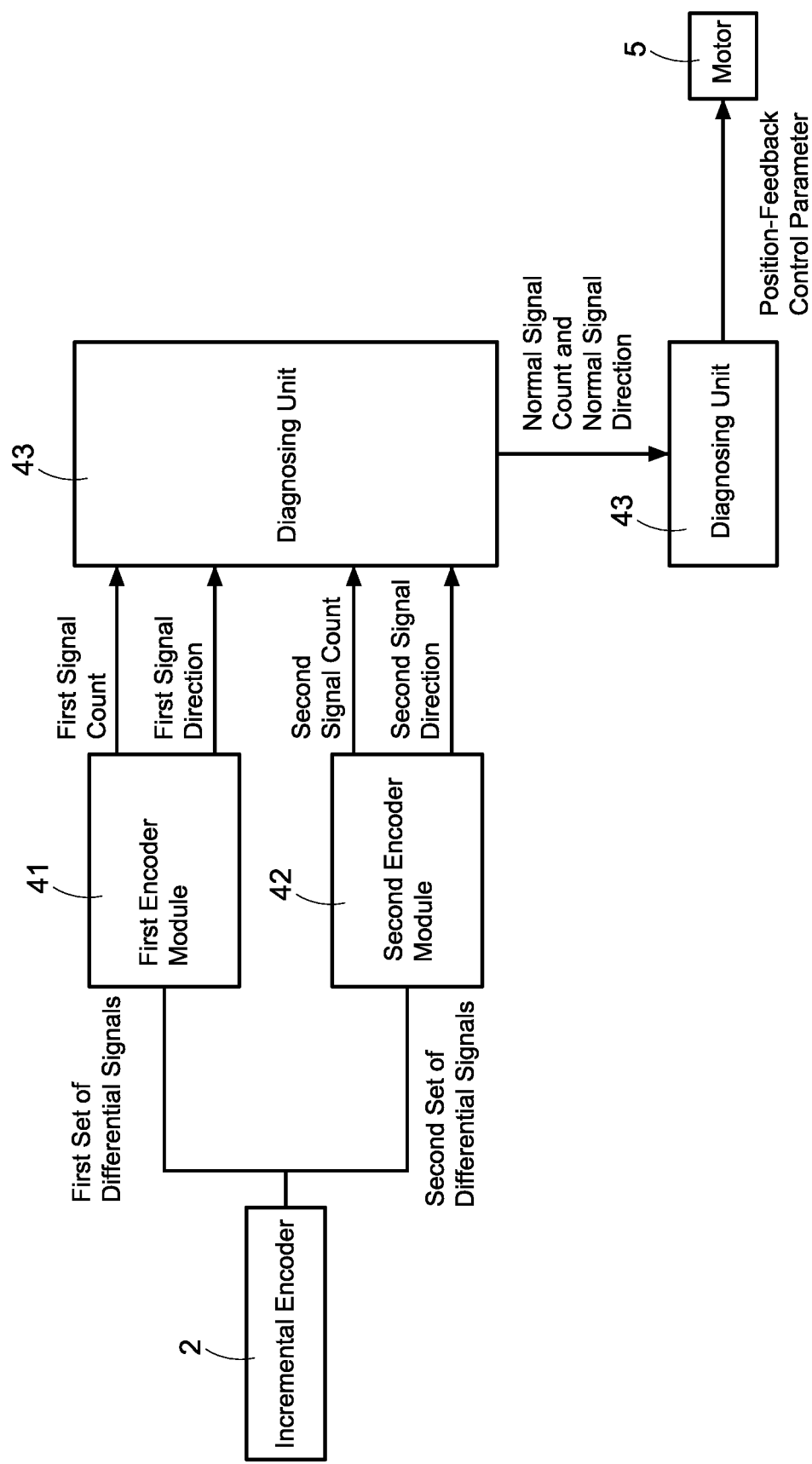
FIG. 3 is a schematic diagram for diagnosis of a first embodiment according to the present disclosure.

Please refer to FIG. 3 at the same time, wherein FIG. 3 is a schematic diagram for diagnosis of a first embodiment according to the present disclosure. As shown in FIG. 3, the output of the incremental encoder 2 is connected with the first encoder module 41 and the second encoder module 42 of the MCU 4 respectively through multiple external cables and multiple paths inside the motor driver 3, wherein the first encoder module 41 receives a first set of differential signals outputted from the incremental encoder 2, and the second encoder module 42 receives a second set of differential signals outputted from the incremental encoder 2. As shown in FIG. 2, if the multiple external cables of the output of the incremental encoder 2 are normal, the first set of differential signals includes a signal A and a signal B from the incremental encoder 2, and the second set of differential signals includes a signal $\overline{A}$ and a signal $\overline{B}$ from the incremental encoder 2. In particular, the signal $\overline{A}$ is a reverse signal of the signal A, the signal $\overline{B}$ is a reverse signal of the signal B. The reverse signal means a signal that has an identical frequency, an identical amplitude, and an opposite direction in comparison with another signal (detailed described in the following).

In particular, when one or more of the multiple external cables of the output of the incremental encoder 2 is abnormal, a signal composition of the first set of differential signals and/or the second set of differential signals may be different (detailed described in the following).

The detailed discussion of the incremental encoder 2, the multiple sets of differential signals constituted by the signal A, the signal $\overline{A}$, the signal B, and the signal $\overline{B}$ are omitted here for brevity.

In the embodiment shown in FIG. 2, the first encoder module 41 includes a first input 411, a second input 412, and an output 413, the second encoder module 42 includes a first input 421, a second input 422, and an output 423. The motor driver 3 includes a first path 31, a second path 32, a third path 33, and a fourth path 34 for signal transmission, wherein the first path 31 is connected with the first input 411 of the first encoder module 41, the second path 32 is connected with the first input 421 of the second encoder module 42, the third path 33 is connected with the second input 412 of the first encoder module 41, the fourth path 34 is connected with the second input 422 of the second encoder module 42. The first encoder module 41 and the second encoder module 42 respectively output analyzed data to the diagnosing unit 43 and the motor 5 on the downstream of the diagnosing unit 43 through the outputs 413, 423.

As shown in FIG. 2, the motor driver 3 includes a first resistor (R1) 35 and a second resistor (R2) 36, wherein the first resistor 35 is connected between the first path 31 and the second path 32, the second resistor 36 is connected between the third path 33 and the fourth path 34. Through the arrangement of the first resistor 35 and the second resistor 36, the MCU 4 of the present disclosure may compute two signal directions based on the two sets of differential signals and determine whether any of the multiple external cables connected between the incremental encoder 2 and the motor driver 3 is abnormal according to the two signal directions (detailed described in the following).

In the present disclosure, the output of the incremental encoder 2 is connected with multiple inputs of the motor driver 3 through at least four external cables. In particular, the incremental encoder 2 is connected to the first path 31 in the motor driver 3 through a first external cable 21 to provide a signal A to the first input 411 of the first encoder module 41 through the first path 31, connected to the second path 32 in the motor driver 3 through a second external cable 22 to provide a signal A to the first input 421 of the second encoder module 42 through the second path 32, connected to the third path 33 in the motor driver 3 through a third external cable 23 to provide a signal B to the second input 412 of the first encoder module 41 through the third path 33, and connected to the fourth path 34 in the motor driver 3 through a fourth external cable 24 to provide a signal B to the second input 422 of the second encoder module 42 through the fourth path 34.

In the present disclosure, the first encoder module 41 continuously receives the first set of differential signals (i.e., continuously receives the signal A and the signal B through the first path 31 and the third path 33), and continuously computes a first signal information group in accordance with the first set of differential signals. Similarly, the second encoder module 42 continuously receives the second set of differential signals (i.e., continuously receives the signal $\overline{A}$ and the signal $\overline{B}$ through the second path 32 and the fourth path 34), and continuously computes a second signal information group in accordance with the second set of differential signals. In one embodiment, the first signal information group at least includes a first signal count and a first signal direction that are related to the motor 5, and the second signal information group at least includes a second signal count and a second signal direction that are related to the motor 5.

In particular, the first encoder module 41 computes the first signal count and the first signal direction in accordance with information such as electric potential level (i.e., 0 or 1 represented in the waveforms), potential changes with time sequence, potential changing frequency, etc., of the received signal A and signal B, and the second encoder module 42 computes the second signal count and the second signal direction in accordance with information such as electric potential level, potential changes with time sequence, potential changing frequency, etc., of the received signal $\overline{A}$ and signal $\overline{B}$.

Figure 4B:
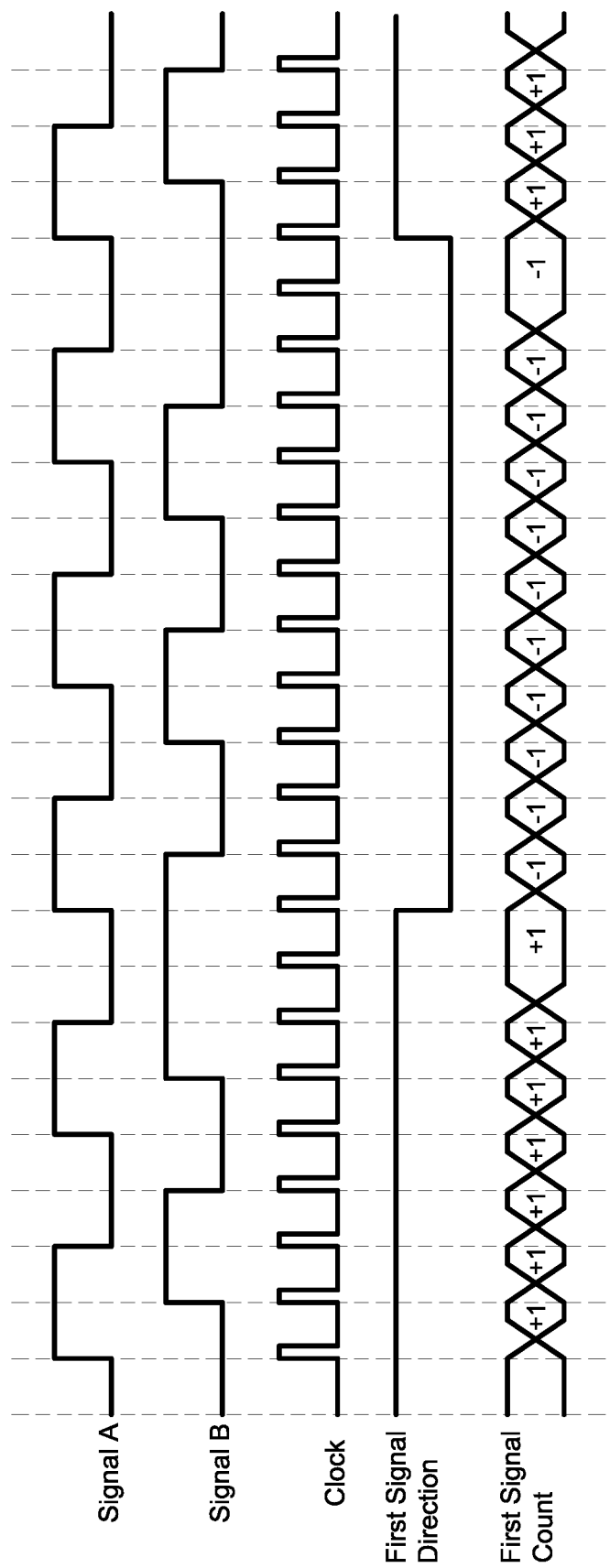
FIG. 4B is a schematic diagram showing a signal count and a signal direction of a second embodiment according to the present disclosure.

Please refer to FIG. 4A and FIG. 4B, FIG. 4A is a schematic diagram showing a signal count of a first embodiment according to the present disclosure, FIG. 4B is a schematic diagram showing a signal count and a signal direction of a second embodiment according to the present disclosure. FIG. 4A and FIG. 4B use the first set of differential signals (namely, the signal A and the signal B) as examples to describe how the first encoder module 41 computes the first signal count and the first signal direction in accordance with the first set of differential signals. The second encoder module 42 may compute the second signal count and the second signal direction in accordance with the second set of differential signals based on same logic, the detailed description is omitted for brevity.

As shown in FIG. 4A, the signal A and the signal B may have periodic changes in electric potential level over time, and the first encoder module 41 may continuously record the potential changes with time sequence of the signal A and the signal B. In the embodiment of FIG. 4A, the potential changes of the signal A and the signal B are represented as (0,0), (1,0), (1,1), (0,1) with time sequence. In this embodiment, a skilled person in the art can understand that the first encoder module 41 may use the potential changing order of (0,0), (1,0), (1,1), (0,1) as a forward direction of the motor 5.

As shown in FIG. 4B, when a clock passed and at least one of the signal A and the signal B produces a potential change, the first signal count is added by 1 by the first encoder module 41. When the potential changing order is switched from the aforementioned order (i.e., (0,0), (1,0), (1,1), (0,1)) to a new order which is: (0,1), (1,1), (1,0), (0,0), the first encoder module 41 accordingly determines that operation of the motor 5 is reversed (namely, rotates in a reverse direction), and records a reverse direction to the first signal direction. In FIG. 4A and FIG. 4B, a high potential is represented as a forward direction, and a low potential is represented as a reverse direction. When the potential changing order is switched back to the above order which is: (0,0), (1,0), (1,1), (0,1), the first encoder module 41 determines that operation of the motor 5 is reversed again (back to the forward direction), and records another forward direction to the first signal direction.

By using the aforementioned approach, the first encoder module 41 may continuously compute the first signal count (whether to add 1 to the first signal count or not) and the first signal direction (the forward direction or the reverse direction) in accordance with the signal composition of the continuous received first set of differential signals. Similarly, the second encoder module 42 may continuously compute the second signal count and the second signal direction in accordance with the continuous received second set of differential signals by using the same approach, the detailed description is omitted here.

Next, as shown in FIG. 3, the MCU 4 uses the first signal information group including the first signal count and the first signal direction computed by the first encoder module 41 as an input parameter of the diagnosing unit 43, and uses the second signal information group including the second signal count and the second signal direction computed by the second encoder module 42 as another input parameter of the diagnosing unit 43. Therefore, the diagnosing unit 43 may compute a first parameter information group related to the motor 5 based on the first signal information group, and compute a second parameter information group related to the motor 5 based on the second signal information group. In one embodiment, the first parameter information group at least includes a first signal rotating speed, a first signal angle, and the aforementioned first signal direction, which are related to the motor 5, and the second parameter information group at least includes a second signal rotating speed, a second signal angle, and the aforementioned second signal direction, which are related to the motor 5, but not limited thereto.

One technical feature of the present disclosure is that, the MCU 4 compares the content of the first parameter information group and the content of the second parameter information group through the diagnosing unit 43, and determines whether the first parameter information group computed based on the first set of differential signals (corresponding to the signal A and the signal B received through the first path 31 and the third path 33) is consistent with the second parameter information group computed based on the second set of differential signals (corresponding to the signal $\overline{A}$ and signal $\overline{B}$ received through the second path 32 and the fourth path 34) based on a comparing result. When the diagnosing unit 43 determines that the information of first parameter information group is inconsistent with the information of the second parameter information group after comparing, the diagnosing unit 43 may determine that one of the first set of differential signals and the second set of differential signals is abnormal.

More specific, the diagnosing unit 43 of the present disclosure may firstly determine whether the first parameter information group is consistent with the second parameter information group, and then determine whether at least one of the multiple external cables 21-24 connected between the output of the incremental encoder 2 and the input of the motor driver 3 is abnormal according to the determination result, otherwise determine whether the motor 5 produces an abnormal speed-feedback signal according to the determination result, but not limited thereto. When the diagnosing unit 43 determines that at least one of the multiple external cables 21-24 is abnormal, the diagnosing unit 43 proceeds to compute a normal signal information group based on signals transmitted through one or more normal cables of the multiple external cables 21-24. Therefore, the diagnosing unit 43 may compute a position-feedback control parameter of the motor 5 in accordance with the normal signal information group.

For example, in the embodiment of FIG. 2, the first resistor 35 is connected between the first path 31 and the second path 32. When the first external cable 21 connected to the first path 31 is abnormal, the signal A cannot be provided to the first path 31 from the incremental encoder 2. In this scenario, the signal $\overline{A}$ outputted from the incremental encoder 2 may not only be provided to the second encoder module 42 through the second path 32, but also provided to the first encoder module 41 through the first resistor 35 along the first path 31. Similarly, when the second external cable 22 connected to the second path 32 is abnormal, the signal $\overline{A}$ cannot be provided to the second path 32. In this scenario, the signal A outputted from the incremental encoder 2 may not only be provided to the first encoder module 41 through the first path 31, but also provided to the second encoder module 42 through the first resistor 35 along the second path 32.

Similarly, the second resistor 36 is connected between the third path 33 and the fourth path 34. When the third external cable 23 connected to the third path 33 is abnormal, the signal B cannot be provided to the third path 33. In this scenario, the signal $\overline{B}$ outputted from the incremental encoder 2 may not only be provided to the second encoder module 42 through the fourth path 34, but also provided to the first encoder module 41 through the second resistor 36 along the third path 33. Similarly, when the fourth external cable 24 connected to the fourth path 34 is abnormal, the signal $\overline{B}$ cannot be provided to the fourth path 34. In this scenario, the signal B outputted from the incremental encoder 2 may not only be provided to the first encoder module 41 through the third path 33, but also provided to the second encoder module 42 through the second resistor 36 along the fourth path 34.

As discussed above, according to the arrangement of the first resistor 35 and the second resistor 36, when the first parameter information group and the second parameter information group are inconsistent with each other, it means that the two encoder modules 41, 42 of the MCU 4 do not correctly receive a predetermined signal composition of the first set of differential signals and the second set of differential signals, in other words, the two encoder modules 41, 42 do not correctly receive at least one of the signal A, the signal $\overline{A}$, the signal B, and the signal $\overline{B}$. Therefore, the MCU 4 may determine that at least one of the multiple external cables 21-24 connected between the output of the incremental encoder 2 and the input of the motor driver 3 has an abnormal situation such as a disconnection, a short circuit, an interference, etc.

In one embodiment, the diagnosing unit 43 of the MCU 4 compares the first signal direction of the first parameter information group with the second signal direction of the second parameter information group to determine whether a direction of the first set of differential signals is consistent with a direction of the second set of differential signals. Also, the diagnosing unit 43 determines that one of the first set of differential signals and the second set of differential signals is abnormal when the first signal direction is inconsistent with the second signal direction.

When the diagnosing unit 43 determines that one of the first set of differential signals and the second set of differential signals is abnormal, the diagnosing unit 43 proceeds to find out a normal signal count and a normal signal direction from the first signal information group (including the first signal count and the first signal direction) and the second signal information group (including the second signal count and the second signal direction) through internal determination mechanism (detailed described in the following), and outputs the normal signal count and the normal signal direction to a motor controlling architecture of the diagnosing unit 43. Therefore, the motor controlling architecture of the diagnosing unit 43 may compute the position-feedback control parameter of the motor 5 in accordance with the normal signal count and the normal signal direction, so as to control the motor 5 and accomplish the purpose of redundant output.

By using the diagnosing device of the present disclosure, the MCU 4 may compute and compare the two sets of differential signals through the two encoder modules 41, 42 and the diagnosing unit 43, so as to determine whether a situation of an abnormal cable connection occurs between the output of the incremental encoder 2 and the input of the motor driver 3. When the situation of the abnormal cable connection occurs, the MCU 4 may find a normal set of differential signals immediately, compute a normal signal count and a normal signal direction based on the normal set of differential signals, and input the normal signal count and the normal signal direction to the motor controlling architecture of the diagnosing unit 43. As a result, the diagnosing device of the present disclosure may accomplish a redundant output for the differential signals, keep the motor 5 to rotate even if a part of the output cables is abnormal, and increase the reliability of the system by preventing the motor 5 from downtime due to the abnormal situation of output cable.

Figure 5:
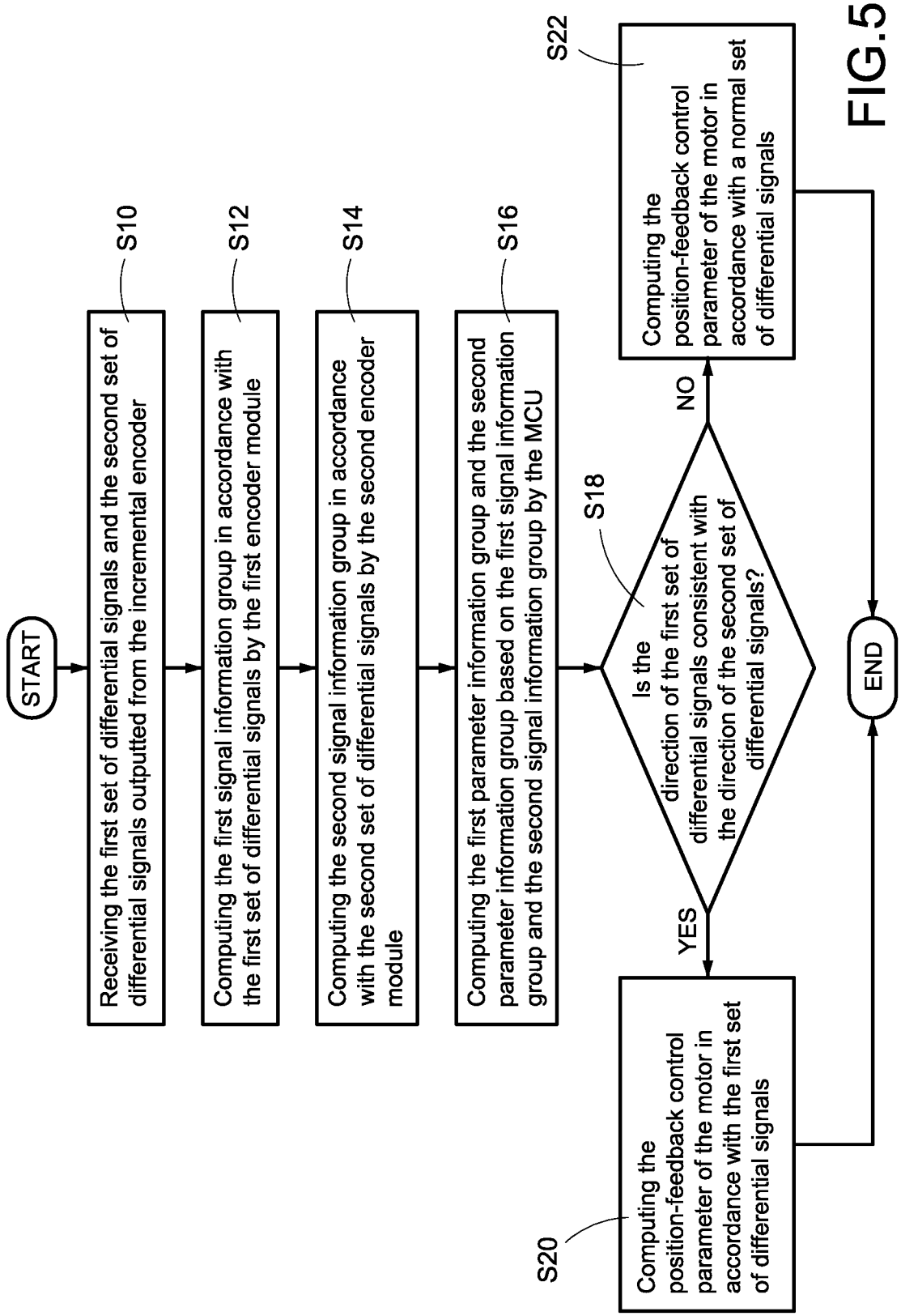
FIG. 5 is a diagnosing flowchart of a first embodiment according to the present disclosure.

Please refer to FIG. 5, which is a diagnosing flowchart of a first embodiment according to the present disclosure. FIG. 5 discloses a diagnosing method for abnormal cable connection of incremental encoder (referred to as a diagnosing method hereinafter). In one embodiment, the diagnosing method is incorporated with the motor driver 3 and the MCU 4 as shown in FIG. 2

As shown in FIG. 5, the diagnosing method, while the motor 5 is rotating (namely, while the electric vehicle incorporated with the motor 5 is running), continuously receives the first set of differential signals outputted from the incremental encoder 2 through the first encoder module 41 of the MCU 4, and continuously receives the second set of differential signals outputted from the incremental encoder 2 through the second encoder module 42 of the MCU 4 (step S10). As discussed above, according to the diagnosing device of the present disclosure, the first set of differential signals received by the first encoder module 41 includes a signal composition of one of the signal A and the signal $\overline{A}$ and one of the signal B and the signal $\overline{B}$ (depending on whether the external cable connected thereto is normal or abnormal), and the second set of differential signals received by the second encoder module 42 includes a signal composition of one of the signal A and the signal $\overline{A}$ and one of the signal B and the signal $\overline{B}$ (depending on whether the external cable connected thereto is normal or abnormal).

Next, the first encoder module 41 computes the first signal information group that includes the first signal count and the first signal direction in accordance with the first set of differential signals (step S12), and the second encoder module 42 computes the second signal information group that includes the second signal count and the second signal direction in accordance with the second set of differential signals (step S14).

After the step S12 and the step S14, the MCU 4 inputs the first signal information group and the second signal information group respectively to the diagnosing unit 43. The diagnosing unit 43 computes the first parameter information group based on the first signal information group, and computes the second parameter information group based on the second signal information group (step S16). As discussed above, the first parameter information group at least includes a first signal rotating speed, a first signal angle, and the aforementioned first signal direction that are related to the motor 5, and the second parameter information group at least includes a second signal rotating speed, a second signal angle, and the aforementioned second signal direction that are related to the motor 5.

The approaches of how to compute each of the parameter information groups (i.e., the signal rotating speeds, the signal angles, and the signal directions) based on each of the signal information groups (i.e., the signal counts and the signal directions) is commonly used in the motor related technical field, detailed description is omitted here.

After the step S16, the MCU 4 compares the first signal direction of the first parameter information group with the second signal direction of the second parameter information group through the diagnosing unit 43, so as to determine whether a direction of the first set of differential signals is consistent with a direction of the second set of differential signals (step S18). In particular, the MCU 4 determines whether the first signal direction is consistent with the second signal direction in the step S18.

In one embodiment, the MCU 4 is preset to use the first set of differential signals to the motor controlling architecture of the diagnosing unit 43, in other words, the diagnosing unit 43 is preset to control the motor 5 in accordance with the first signal information group computed based on the first set of differential signals, wherein the first signal information group at least includes the first signal count and the first signal direction. If the MCU 4 determines that the first signal direction is consistent with the second signal direction in the step S18, it means that both of the first set of differential signals and the second set of differential signals are normal, in other words, all external cables between the output of the incremental encoder 2 and the motor driver 3 are normal. In this scenario, the MCU 4 directly uses the first set of differential signals to the motor controlling architecture of the diagnosing unit 43. Therefore, the diagnosing unit 43 may generate the first signal information group based on the first set of differential signals, and compute the position-feedback control parameter of the motor 5 in accordance with the first signal information group (step S20), so as to control the motor 5.

In another embodiment, the MCU 4 is preset to use the second set of differential signals to the motor controlling architecture of the diagnosing unit 43, in other words, the diagnosing unit 43 is preset to control the motor 5 in accordance with the second signal information group computed based on the second set of differential signals, wherein the second signal information group at least includes the second signal count and the second signal direction. In this embodiment, if the first signal direction is consistent with the second signal direction, the MCU 4 directly uses the second set of differential signals to the motor controlling architecture of the diagnosing unit 43, so the diagnosing unit 43 may generate the second signal information group based on the second set of differential signals, and compute the position-feedback control parameter of the motor 5 in accordance with the second signal information group, so as to control the motor 5.

If the MCU 4 determines that the first signal direction is inconsistent with the second signal direction in the step S18, it means that one of the first set of differential signals and the second set of differential signals is abnormal, in other words, at least one of the multiple external cables 21-24 between the output of the incremental encoder 2 and the motor driver 3 is abnormal. In one embodiment, if a situation of abnormal cable connection occurs to the output of the incremental encoder 2, at least one of the signal A, the signal $\overline{A}$, the signal B, and the signal $\overline{B}$ that the MCU 4 last received from the incremental encoder 2 will be abnormal, namely, the MCU 4 fails to receive a predetermined signal composition. In this scenario, the MCU 4 determines whether the first set of differential signals is abnormal or the second set of differential signals is abnormal through an internal determination mechanism (detailed described in the following). Also, the MCU 4 finds a signal count and a signal direction (referred to as a normal signal count and a normal signal direction) that are computed in accordance with a normal one of the first set of differential signals and the second set of differential signals, and inputs the normal signal count and the normal signal direction to the motor controlling architecture of the diagnosing unit 43 for the diagnosing unit 43 to compute the position-feedback control parameter of the motor 5 in accordance with the normal signal count and the normal signal direction (step S22), so as to control the motor 5.

According to the above embodiment, the technical solution of the present disclosure uses the first encoder module 41 to compute the first set of differential signals and use the computation result to be a controlling basis of the motor 5, or uses the second encoder module 42 to compute the second set of differential signals and use the computation result to be the controlling basis of the motor 5. When one of the first set of differential signals and the second set of differential signals received by the MCU 4 is abnormal, the diagnosing unit 43 may still control the motor 5 through the signal count and the signal direction that are computed based on a normal one of the first set of differential signals and the second set of differential signals. Therefore, the present disclosure may achieve a redundant effect, and prevent the motor 5 from downtime.

Please refer to FIG. 6A, FIG. 6B, FIG. 6C and FIG. 6D, which are schematic diagrams respectively showing signals of a first embodiment, a second embodiment, a third embodiment, and a fourth embodiment, according to the present disclosure.

Figure 6:
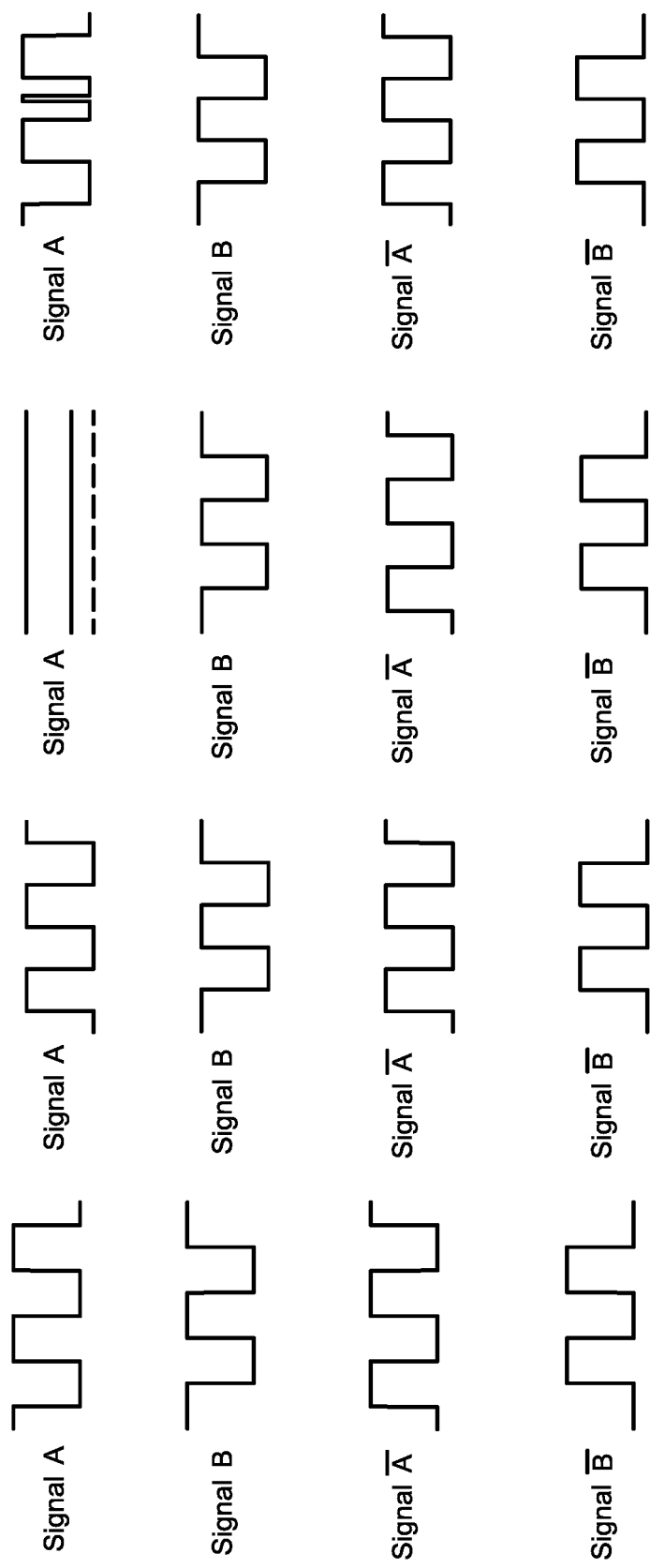
FIG. 6A is a schematic diagram showing signals of a first embodiment according to the present disclosure.
FIG. 6B is a schematic diagram showing signals of a second embodiment according to the present disclosure.
FIG. 6C is a schematic diagram showing signals of a third embodiment according to the present disclosure.
FIG. 6D is a schematic diagram showing signals of a fourth embodiment according to the present disclosure.

FIG. 6A shows a situation that all signals (including a signal A, a signal $\overline{A}$, a signal B, and a signal $\overline{B}$) received by the MCU 4 through the multiple paths 31-34 are normal. As shown in FIG. 6A, if all the signals are normal, the phase of the signal A leads the phase of the signal B, the phase of the signal $\overline{A}$ leads the phase of the signal $\overline{B}$, the frequency of the signal A is the same as the frequency of the signal B, the frequency of the signal $\overline{A}$ is the same as the frequency of the signal $\overline{B}$, the signal A is reverse to the signal $\overline{A}$, and the signal B is reverse to the signal $\overline{B}$.

FIG. 6B shows a situation that a first external cable 21 for the incremental encoder 2 to output the signal A is disconnected and all other external cables 22-24 are normal. As shown in FIG. 6B, when the first external cable 21 used to output the signal A is disconnected, the phase of the corresponding signal A lags the phase of the signal B, but the phase of the signal $\overline{A}$ still leads the phase of the signal $\overline{B}$, and the frequency of the signal A is the same as the frequency of the signal B. In particular, when the first external cable 21 is disconnected, the first encoder module 41 cannot receive the signal A from the incremental encoder 2, instead the first encoder module 41 receives the signal $\overline{A}$ transmitted from the first resistor 35 along the first path 31.

FIG. 6C shows a situation that a first external cable 21 for the incremental encoder 2 to output the signal A is short circuited and all other external cables 22-24 are normal. As shown in FIG. 6C, when the first external cable 21 used to output the signal A is short circuited, the corresponding signal A is abnormal (no signal is presented in FIG. 6C for an instance), the phase of the signal $\overline{A}^-$ still leads the phase of the signal $\overline{B}$, and the frequency of the signal A is different from the frequency of the signal B.

FIG. 6D shows a situation that a first external cable 21 for the incremental encoder 2 to output the signal A is temporarily interfered and all other external cables 22-24 are normal. As shown in FIG. 6D, when the first external cable 21 used to output the signal A is temporarily interfered, the corresponding signal A temporarily has a signal abnormal (FIG. 6D shows a sudden appeared pulse for an instance), the phase of the signal $\overline{A}$ still leads the phase of the signal $\overline{B}$, and the frequency of the signal A is temporarily different from the frequency of the signal B.

As shown in FIG. 6A to FIG. 6D, if any one of the external cables 21-24 connected between the incremental encoder 2 and the motor driver 3 is abnormal (such as a disconnection, a short circuit, an interference, etc.), at least one signal received by the MCU 4 will change (i.e., the status of the signals received by the MCU 4 are different from an expected status as shown in FIG. 6A). In the present disclosure, the first encoder module 41 and the second encoder module 42 respectively compute the first signal information group and the second signal information group based on the first set of differential signals and the second set of differential signals, and the diagnosing unit 43 determines whether the two signal information groups are consistent with each other, so as to determine whether the two sets of differential signals received by the MCU 4 are normal. In particular, if the signal A, the signal $\overline{A}$, the signal B, and the signal $\overline{B}$ received by the MCU 4 through the external cables 21-24 are all normal, a result of comparing the first signal information group and the second signal information group will be consistent, otherwise it will be different.

In another embodiment, the diagnosing unit 43 receives the first signal information group and the second signal information group, computes the aforementioned first parameter information group based on the first signal information group, computes the aforementioned second parameter information group based on the second signal information group, and then determines whether the first parameter information group is consistent with the second parameter information group, so as to determine whether the two sets of differential signals received by the MCU 4 are normal. However, the above description is only one embodiment of the present disclosure, not limited thereto.

FIG. 6A to FIG. 6D illustrate different situations exemplified by that the first external cable 21 used by the incremental encoder 2 to output the signal A is normal, disconnected, short circuited, or interfered. When the second external cable 22, the third external cable 23, or the fourth external cable 24 used for the incremental encoder 2 to respectively output the signal $\overline{A}^-$, the signal B, the signal $\overline{B}$ is disconnected, short circuited, or interfered, the corresponding waveforms will be affected and changed similar to the disclosure shown in FIG. 6A to FIG. 6D.

In the embodiment of FIG. 5, the diagnosing unit 43 of the MCU 4 determines whether the first set of differential signals or the second set of differential signals is abnormal based on the first signal direction of the first parameter information group and the second signal direction of the second parameter information group. In another embodiment, the MCU 4 may determine whether the first set of differential signals or the second set of differential signals is abnormal in accordance with the first signal rotating speed and the first signal angle of the first parameter information group and the second signal rotating speed and the second signal angle of the second parameter information group. Therefore, the accuracy of the diagnosing result may be improved to prevent mis-determination.

Figure 7:
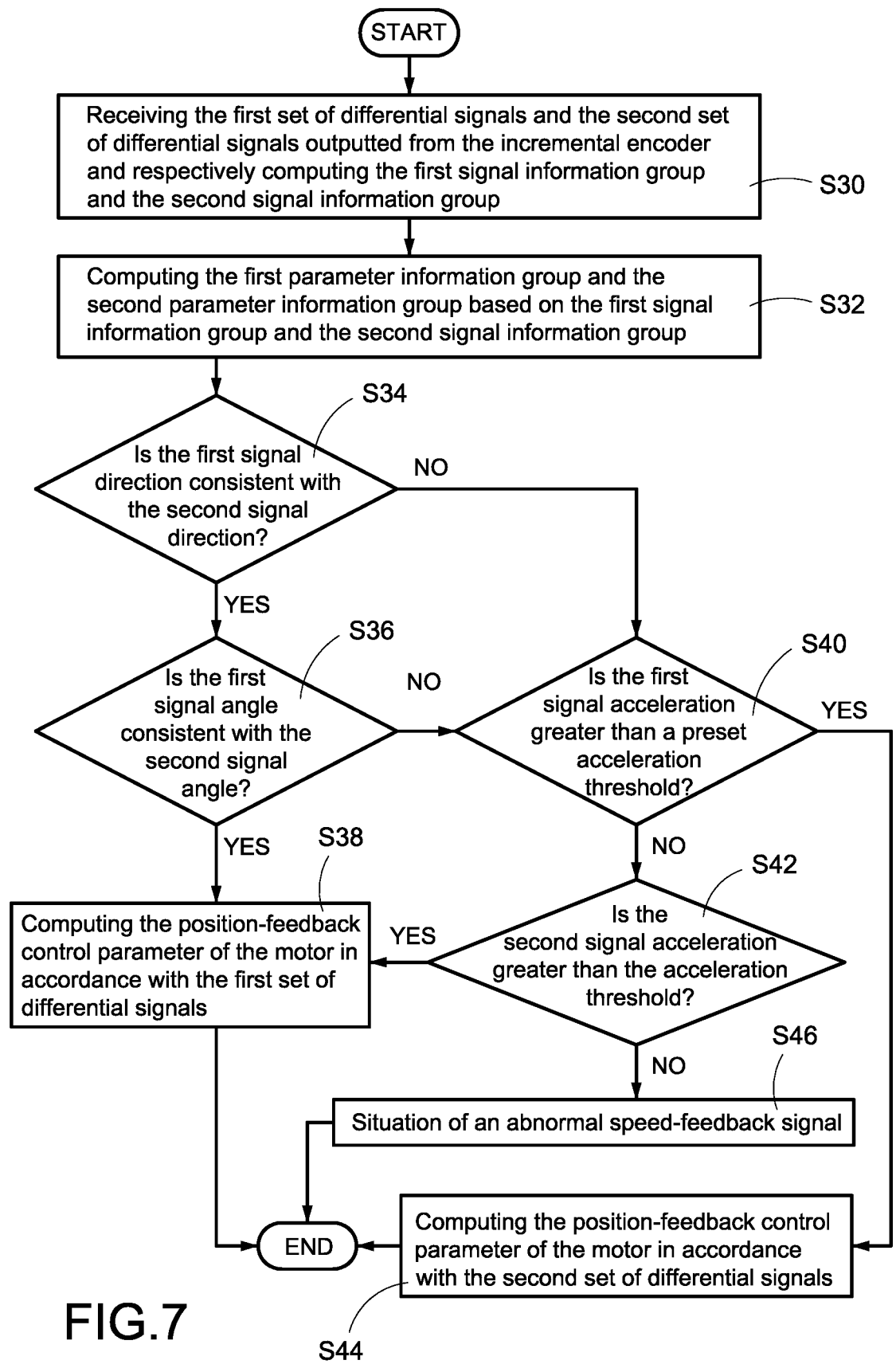
FIG. 7 is a diagnosing flowchart of a second embodiment according to the present disclosure.

Please refer to FIG. 7, which is a diagnosing flowchart of a second embodiment according to the present disclosure. Similar to the embodiment of FIG. 5, in the embodiment of FIG. 7, the MCU 4 continuously receives the first set of differential signals outputted from the incremental encoder 2 through the first encoder module 41, and continuously receives the second set of differential signals outputted from the incremental encoder 2 through the second encoder module 42. The first encoder module 41 continuously computes the first signal information group in accordance with the first set of differential signals, and the second encoder module 42 continuously computes the second signal information group in accordance with the second set of differential signals (step S30). As discussed above, according to the diagnosing device of the present disclosure, the first set of differential signals includes a signal composition of one of the signal A and the signal $\overline{A}$ and one of the signal B and the signal $\overline{B}$, the second set of differential signals includes a signal composition of one of the signal A and the signal $\overline{A}$ and one of the signal B and the signal $\overline{B}$, the first signal information group includes a first signal count and a first signal direction, and the second signal information group includes a second signal count and a second signal direction.

Similarly, after the step S30, the MCU 4 respectively inputs the first signal information group and the second signal information group to the diagnosing unit 43, so that the diagnosing unit 43 computes the first parameter information group based on the first signal information group and computes the second parameter information group based on the second signal information group (step S32). As mentioned above, the first parameter information group at least includes a first signal rotating speed, a first signal angle, and the aforementioned first signal direction that are related to the motor 5, and the second parameter information group at least includes a second signal rotating speed, a second signal angle, and the aforementioned second signal direction that are related to the motor 5.

Next, the MCU 4 compares the first signal direction of the first parameter information group with the second signal direction of the second parameter information group through the diagnosing unit 43 to determine whether the first signal direction is consistent with the second signal direction (step S34). In particular, the MCU 4 uses the consistency of the first signal direction and the second signal direction as a determination basis to determine whether the direction of the first set of differential signals received by the first encoder module 41 is consistent with the direction of the second set of differential signals received by the second encoder module 42.

As mentioned, the signal $\overline{A}$ is a reverse signal of the signal A, the signal $\overline{B}$ is a reverse signal of the signal B. If all output cables of the incremental encoder 2 are normal, the first set of differential signals received by the first encoder module 41 includes the signal A and the signal B, the second set of differential signals received by the second encoder module 42 includes the signal $\overline{A}$ and the signal $\overline{B}$, and the direction of the first set of differential signals is consistent with the direction of the second set of differential signals. In other words, the first signal direction is consistent with the second signal direction.

In an embodiment, when the MCU 4 determines that the first signal direction is consistent with the second signal direction in the step S34, the MCU 4 further determines whether the first signal angle of the first parameter information group is consistent with the second signal angle of the second parameter information group through the diagnosing unit 43 (step S36). When the MCU 4 determines that the first signal angle is consistent with the second signal angle, the MCU 4 uses the first set of differential signals to the motor controlling architecture of the diagnosing unit 43, so that the diagnosing unit 43 computes the position-feedback control parameter of the motor 5 in accordance with the first signal information group generated based on the first set of differential signals (step S38).

It should be mentioned that, if the MCU 4 is preset to compute the position-feedback control parameter of the motor 5 in accordance with the second set of differential signals, then in the step S38, the MCU 4 uses the second set of differential signals to the motor controlling architecture of the diagnosing unit 43 for the diagnosing unit 43 to compute the position-feedback control parameter of the motor 5 in accordance with the second signal information group generated based on the second set of differential signals, and not limited to the disclosure as shown in FIG. 7.

If the MCU 4 determines that the first signal angle and the second signal angle are different in the step S36, the MCU 4 determines that one of the first set of differential signals and the second set of differential signals is abnormal. In this scenario, the MCU 4 finds, through the diagnosing unit 43, which one of the first set of differential signals and the second set of differential signals is an abnormal set of differential signals, and which one of the first set of differential signals and the second set of differential signals is a normal set of differential signals. Accordingly, the MCU 4 computes the position-feedback control parameter of the motor 5 in accordance with a signal information group generated based on the normal set of differential signals.

In one embodiment, the MCU 4 determines that the first signal angle and the second signal angle are different when an angle difference between the first signal angle and the second signal angle is greater than or equal to a preset angle error threshold (for example, 5 degree). Also, the MCU 4 determines that the first signal angle and the second signal angle are consistent with each other when the angle difference between the first signal angle and the second signal angle is smaller than the angle error threshold.

It should be mentioned that, the angle difference is caused by a short circuit or a disconnection of the external cables and is increased overtime. Different motors may have different angle-error tolerance ranges according to their characteristics while rotating. However, an angle and an output torque (N–m) of a motor are positive correlated, and this characteristic can be used to determine an angle error threshold corresponding to a motor currently used (for example, a 10% range of a torque error of a motor can be used to correspondingly compute an angle error threshold of the motor), and the computed angle error threshold can be used to determine whether the first signal angle is consistent with the second signal angle.

In particular, a formula to calculate a torque of a permanent-magnet synchronous motor may be expressed as: $T=1.5*(P/2)*(\lambda*iq+(Ld-Lq)*id*iq)$, wherein P is motor pole number, $\lambda$ is a torque constant, id and iq are d-axis current and q-axis current of a rotor, Ld and Lq are d-axis inductance and q-axis inductance of the rotor. The above parameters may be obtained through motor feedback, and a motor torque may be computed to get the aforementioned angle error threshold. If the angle difference between the first signal angle and the second signal angle is smaller than the computed angle error threshold, the MCU 4 does not determine that the first signal angle and the second signal angle are inconsistent, and the MCU 4 does not determine that any of the first set of differential signals and the second set of differential signals is abnormal accordingly. However, the above description is only one embodiment of the present disclosure, but not limited thereto.

In the embodiment, if the MCU 4 determines that the first signal direction and the second signal direction are inconsistent with each other in the step S34 (i.e., the direction of the first set of differential signals is inconsistent with the direction of the second set of differential signals), or determines that the first signal angle and the second signal angle are inconsistent with each other in the step S36, the MCU 4 further computes a first signal acceleration based on the first signal rotating speed of the first parameter information group, and further computes a second signal acceleration based on the second signal rotating speed of the second parameter information group. Also, the MCU 4 determines whether the first signal acceleration is greater than a preset acceleration threshold (step S40), and determines whether the second signal acceleration is greater than the acceleration threshold (step S42).

If the MCU 4 determines that the first signal acceleration is greater than the acceleration threshold in the step S40 (i.e., the speed changes rapidly in an instant), the MCU 4 may determine that the first external cable 21 or the third external cable 23 (i.e., the cables respectively connected with the first path 31 and the third path 33 in the motor driver 3) between the incremental encoder 2 and the motor driver 3 is abnormal, and the abnormal cable causes the abnormal of the first set of differential signals. In this scenario, the MCU 4 uses the second set of differential signals to the motor controlling architecture of the diagnosing unit 43, and the diagnosing unit 43 computes the position-feedback control parameter of the motor 5 in accordance with the second signal information group generated based on the second set of differential signals (step S44).

If the MCU 4 determines that the first signal acceleration is not greater than the acceleration threshold in the step S40, but determines that the second signal acceleration is greater than the acceleration threshold in the step S42, the MCU 4 may determine that the second external cable 22 or the fourth external cable 24 (i.e., the cables respectively connected with the second path 32 and the fourth path 34 in the motor driver 3) between the incremental encoder 2 and the motor driver 3 is abnormal, and the abnormal cable causes the abnormal of the second set of differential signals. In this scenario, the MCU 4 uses the first set of differential signals to the motor controlling architecture of the diagnosing unit 43, and the diagnosing unit 43 computes the position-feedback control parameter of the motor 5 in accordance with the first signal information group generated based on the first set of differential signals (step S38).

It should be mentioned that, if the MCU 4 determines, by using the diagnosing unit 43 to perform a comparison, that the first signal direction and the second signal direction are inconsistent with each other or the first signal angle and the second signal angle are inconsistent with each other, but neither the first signal acceleration nor the second signal acceleration is greater than the acceleration threshold, it means that the abnormal situation at the very time does not belong to any of the disconnection, the short circuit and the signal interference as discussed above. In this scenario, the MCU 4 determines that the motor 5 is under an abnormal situation of an abnormal speed-feedback signal (step S46), and the MCU 4 controls the motor 5 to stop rotating. However, the above abnormal status is only one embodiment of the present disclosure, but not limited thereto.

In one embodiment, the MCU 4 controls the diagnosing unit 43 to compute the first signal acceleration through a first formula in the step S40, the first formula is expressed as: $|\omega_1(k)-\omega_1(k-1)/t(k)-t(k-1)|$, and the MCU 4 controls the diagnosing unit 43 to compute the second signal acceleration through a second formula in the step S42, the second formula is expressed as: $|\omega_2(k)-\omega_2(k-1)/t(k)-t(k-1)|$. Also, the acceleration threshold used by the MCU 4 in this embodiment may be expressed as: $|T_{max}/J|$, wherein $\omega_1$ is a first signal rotating speed, $\omega_2$ is a second signal rotating speed, $t(k-1)$ is a first sampling time, $t(k)$ is a second sampling time, $T_{max}$ is a maximum torque of a motor, and J is a total inertia value of the motor. It should be mentioned that the acceleration of the motor is directional, and the torque of the motor can be negative in some application. The technical solution of the present disclosure only determines the differences between signals based on the accelerations, and evaluates the angle error threshold based on the motor torque, so the above formulas of the first signal acceleration, the second signal acceleration, and the acceleration threshold are computed by using absolute values.

If a motor 5 used by an electric vehicle is determined, the maximum torque and the inertia of the motor 5 can be assured. Therefore, the MCU 4 of the diagnosing device may consider the acceleration threshold as a known parameter.

It should be mentioned that, in the embodiment, the MCU 4 may use 0.1 microsecond as a time unit or a time interval (i.e., a second time minus a first time is 0.1 microsecond), and use the time unit/time interval as a diagnosing frequency, but not limited thereto.

Figure 8B:
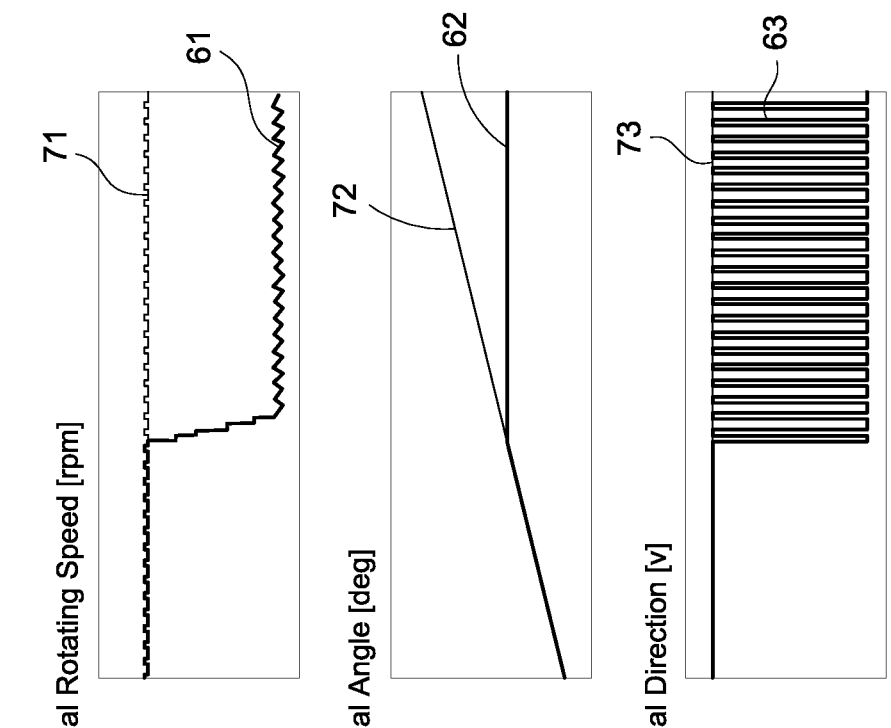
FIG. 8B is a schematic diagram showing a signal rotating speed, a signal angle, and a signal direction of a second embodiment according to the present disclosure.
Figure 8A:
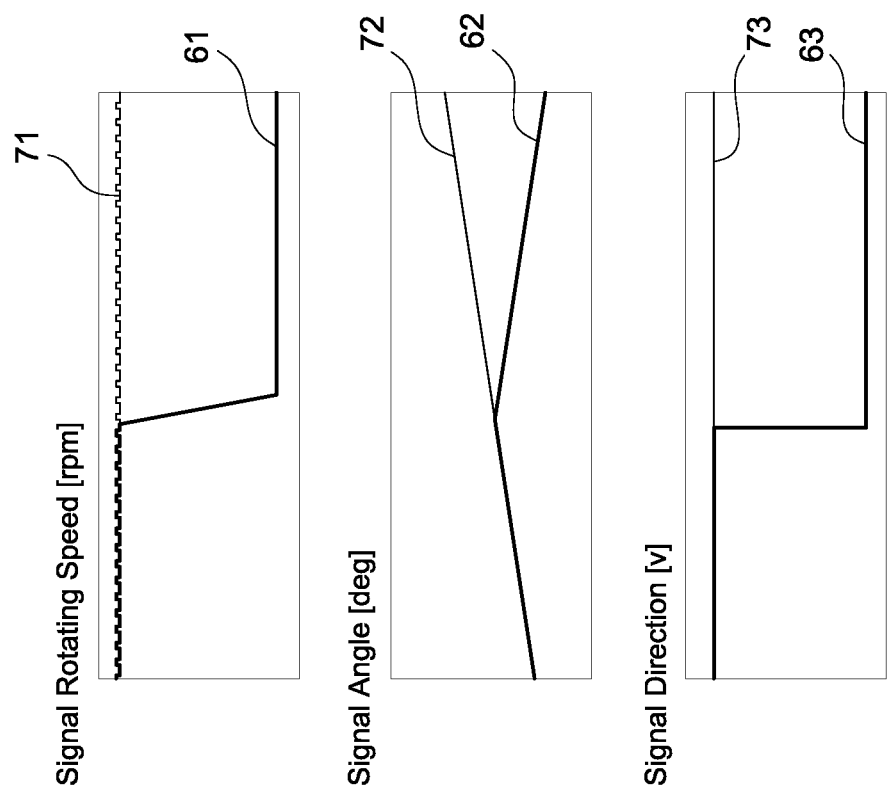
FIG. 8A is a schematic diagram showing a signal rotating speed, a signal angle, and a signal direction of a first embodiment according to the present disclosure.
Figure 8C:
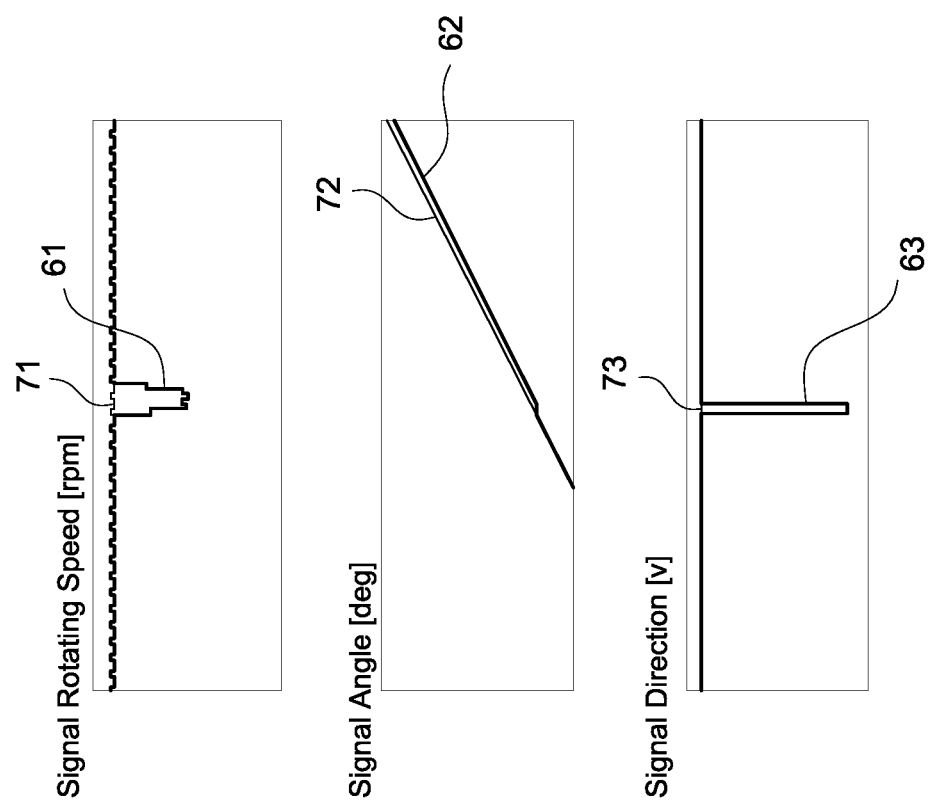
FIG. 8C is a schematic diagram showing a signal rotating speed, a signal angle, and a signal direction of a third embodiment according to the present disclosure.

Please refer to FIG. 8A, FIG. 8B and FIG. 8C, which are schematic diagrams respectively showing a signal rotating speed, a signal angle, and a signal direction of a first embodiment, a second embodiment, and a third embodiment, according to the present disclosure. FIG. 8A to FIG. 8C are used to illustrate how an abnormal differential signal received by the MCU 4 affects the aforementioned signal direction, signal angle, and signal rotating speed.

FIG. 8A shows a situation that a first external cable 21 used for the incremental encoder 2 to output the signal A is disconnected. As shown in FIG. 8A, if the signal A predetermined to be received by the MCU 4 is abnormal due to a cable disconnection (i.e., the first set of differential signals is abnormal and includes the signal $\overline{A}$ received through the first resistor 35 and the signal B received through the third path 33), it may cause a first signal rotating speed 61 computed based on the first set of differential signals to reduce, cause a first signal angle 62 computed based on the first set of differential signals to reverse, and cause a first signal direction 63 computed based on the first set of differential signals to reverse. In the meantime, the external cables 22-24 corresponding to the signal $\overline{A}$, the signal B, and the signal $\overline{B}$ are normal (i.e., the second set of differential signals is normal and includes the signal $\overline{A}$ received through the second path 32 and the signal $\overline{B}$ received through the fourth path 34), so a second signal rotating speed 71, a second signal angle 72, and a second signal direction 73 computed based on the second set of differential signals remain in normal waveforms.

The above description is only one embodiment of the present disclosure, when any of the signal $\overline{A}$, the signal B, the signal $\overline{B}$ predetermined to be received by the MCU 4 is abnormal due to cable disconnection, the signal composition of the first set of differential signals or the second set of differential signals may be changed, and the MCU 4 may perform a determination to the signal rotating speed, the signal angle, and the signal direction according to the aforementioned approach, detailed description is omitted.

FIG. 8B shows a situation that a first external cable 21 used for the incremental encoder 2 to output the signal A is short circuited. As shown in FIG. 8B, if the signal A predetermined to be received by the MCU 4 is abnormal due to short circuited (i.e., the first set of differential signals is abnormal and includes the signal $\overline{A}$ received through the first resistor 35 and the signal B received through the third path 33), it may cause a first signal rotating speed 61 computed based on the first set of differential signals to reduce, cause a first signal angle 62 computed based on the first set of differential signals to stay, and cause a first signal direction 63 computed based on the first set of differential signals to continuously switch between a forward direction and a reverse direction. Similarly, the signal $\overline{A}$ and the signal $\overline{B}$ are normal in this embodiment (i.e., the second set of differential signals is normal and includes the signal $\overline{A}$ and the signal $\overline{B}$), so a second signal rotating speed 71, a second signal angle 72, and a second signal direction 73 computed based on the second set of differential signals remain in normal waveforms.

FIG. 8C shows a situation that a first external cable 21 for the incremental encoder 2 to output the signal A is temporarily interfered. As shown in FIG. 8C, when the signal A received by the MCU 4 is temporary abnormal due to cable interference (i.e., the first set of differential signals is temporarily abnormal), it may cause a first signal rotating speed 61 computed based on the first set of differential signals to reduce instantly and temporarily, cause a first signal angle 62 computed based on the first set of differential signals to produce an error temporarily, and cause a first signal direction 63 computed based on the first set of differential signals to reverse temporarily. However, the aforementioned abnormal only occurs in an instant time, the signals remain in normal waveforms in the rest of the time. Similarly, the signal $\overline{A}$ and the signal $\overline{B}$ are normal in this embodiment (i.e., the second set of differential signals is normal), so a second signal rotating speed 71, a second signal angle 72, and a second signal direction 73 computed based on the second set of differential signals remain in normal waveforms.

As discussed above, the diagnosing device of the present disclosure receives and processes the first set of differential signals through the first encoder module 41, and receives and processes the second set of differential signals through the second encoder module 42. When any signal of the signal composition of the two sets of differential signals is abnormal, the MCU 4 may still control the motor 5 through a redundant output, so as to prevent the motor 5 from downtime. As a result, the reliability of the system may be effectively increased.

Figure 1:
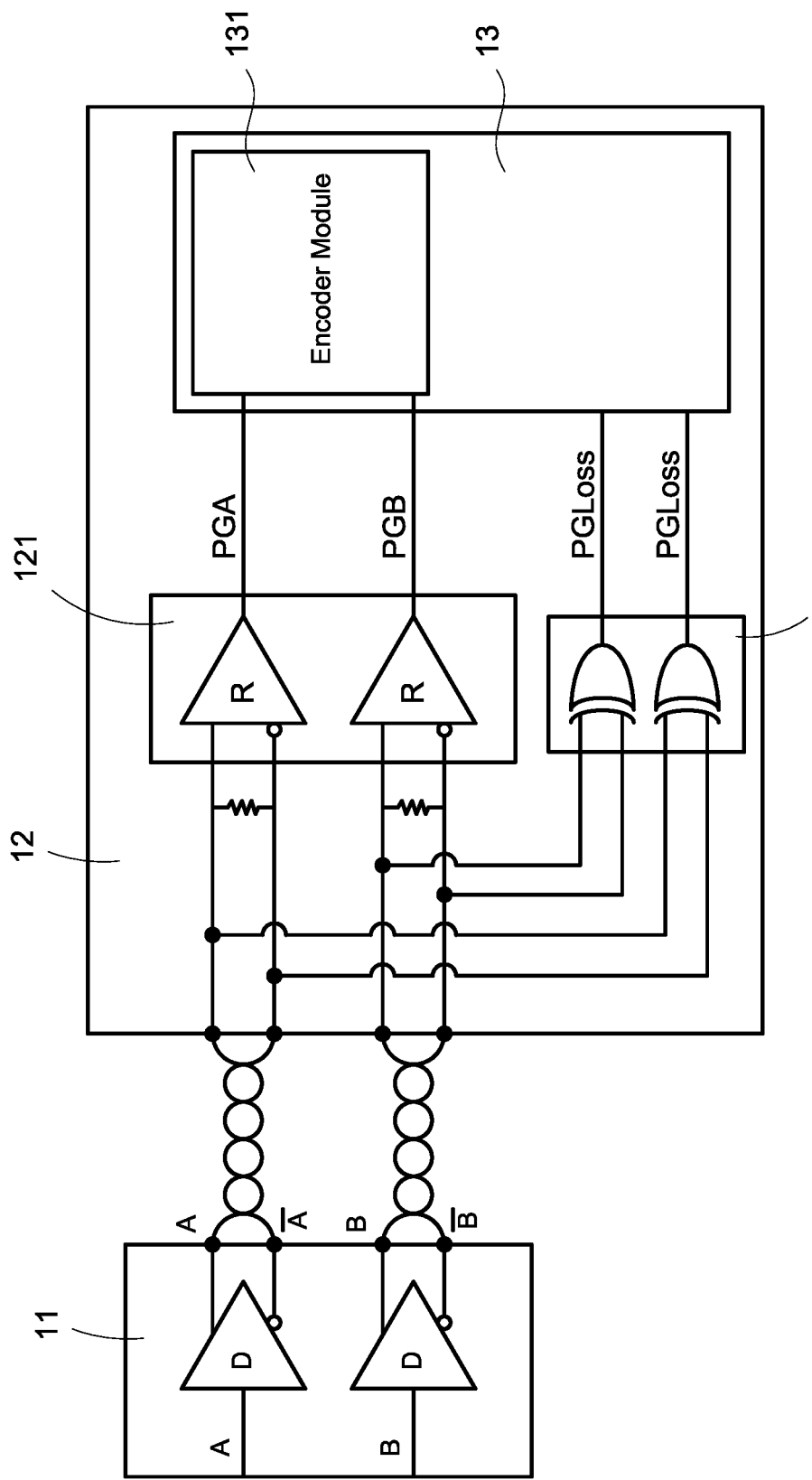
FIG. 1 is a schematic diagram of a motor driver in related art.
Figure 9A:
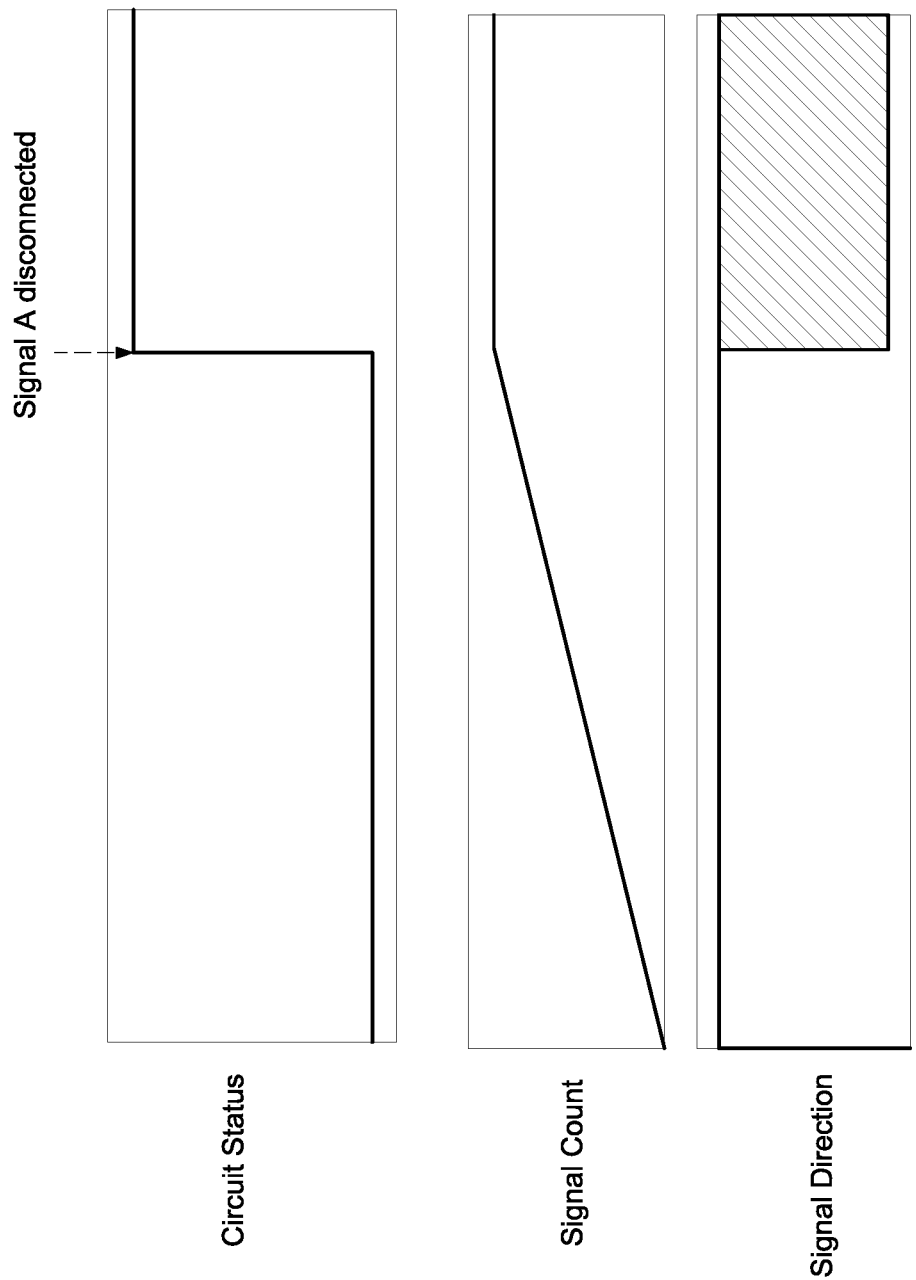
FIG. 9A is a schematic diagram showing a redundant effect of a first embodiment according to the present disclosure.
Figure 9B:
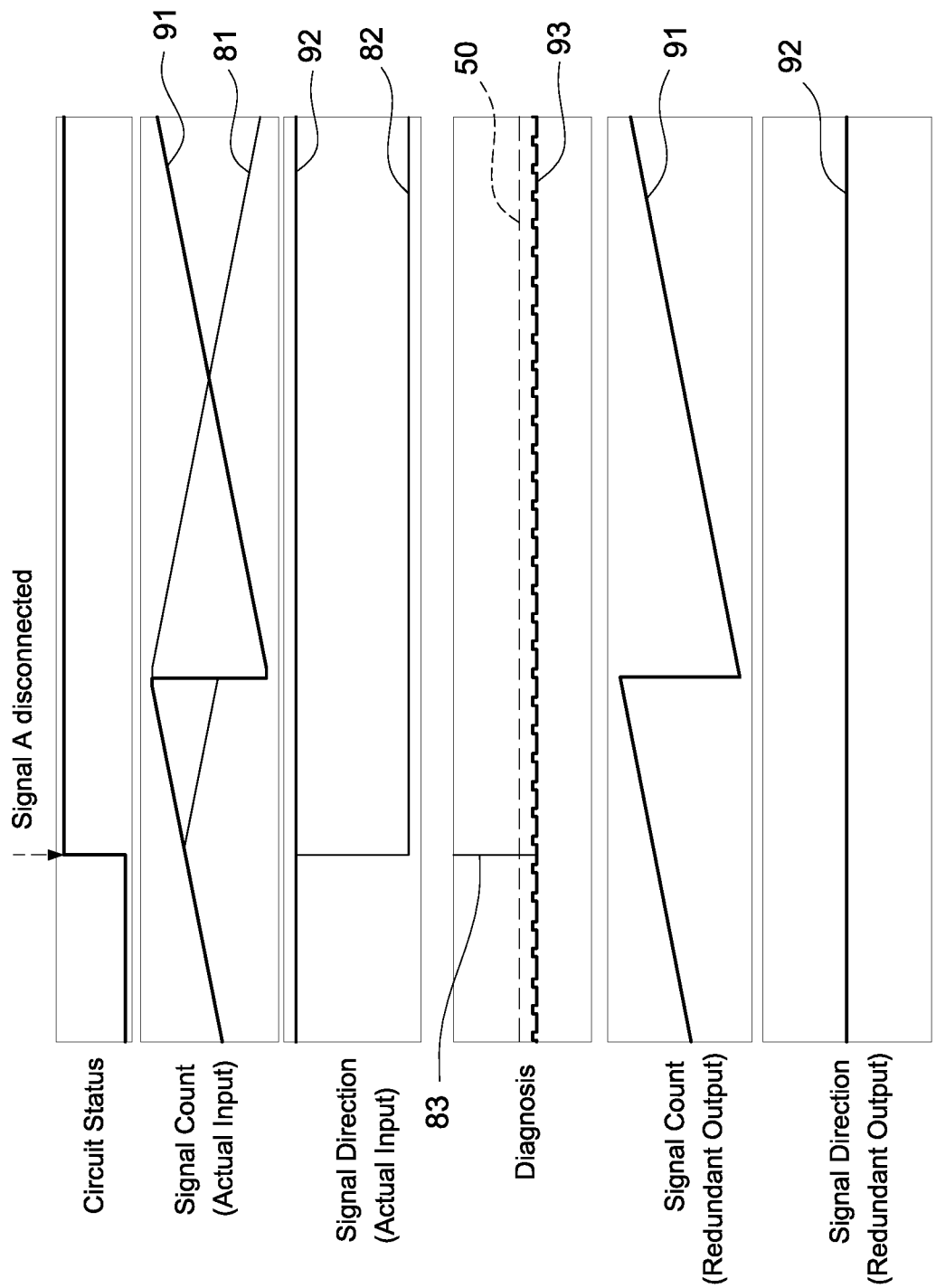
FIG. 9B is a schematic diagram showing a redundant effect of a second embodiment according to the present disclosure.

Please refer to FIG. 9A and FIG. 9B, which are schematic diagrams respectively showing a redundant effect of a first embodiment and a second embodiment according to the present disclosure. As shown in FIG. 9A, if a motor is controlled by the controlling architecture of related-art (for example, the architecture as shown in FIG. 1), when a cable connected to the output of the incremental encoder for outputting the signal A is disconnected at a certain time point, the MCU immediately stops calculating the signal count and cannot keep detecting the signal direction. As a result, the motor needs to stop rotating.

As shown in the upper part of FIG. 9B, by using the diagnosing device of the present disclosure (such as the diagnosing device shown in FIG. 2 and FIG. 3), when a first external cable 21 connected to the output of the incremental encoder 2 for outputting the signal A is disconnected at a certain time point, the first set of differential signals received by the first encoder module 41 at the very time may include the signal $\overline{A}$ and the signal B, and the first signal count 81 computed based on the first set of differential signals may be abnormal. However, the second set of differential signals received by the second encoder module 42 remains a predetermined signal composition, namely, the second set of differential signals includes the signal $\overline{A}$ and the signal $\overline{B}$. Therefore, the second signal count 91 computed based on the second set of differential signals is normal. Besides, though a first signal direction 82 computed by the first encoder module 41 based on the first set of differential signals is abnormal, but a second signal direction 92 computed by the second encoder module 42 based on the second set of differential signals remains normal.

As shown in FIG. 9B, when the MCU 4 determines that one of the first set of differential signals and the second set of differential signals is abnormal after comparing the two sets of differential signals, the MCU 4 may compute a first signal acceleration 83 and a second signal acceleration 93 in accordance with the aforementioned approaches. After a further comparison, the MCU 4 may find out that the first signal acceleration 83 is greater than or equal to an acceleration threshold 50 (illustrated by a dotted line in FIG. 9B) at the moment when the first external cable 21 is disconnected, and the second signal acceleration 93 remains smaller than the acceleration threshold 50. In this case, the MCU 4 may determine that the first set of differential signals is abnormal and the second set of differential signals is normal.

As shown in the bottom part of FIG. 9B, the MCU 4 in this case may use the second set of differential signals to the controlling architecture of the motor 5 (i.e., uses the second signal count 91 and the second signal direction 92 computed based on the second set of differential signals as a computation control basis of the motor 5), and abandon the first signal count 81 and the first signal direction 82 (i.e., abandon the first set of differential signals), so as to provide a redundant output to keep the motor 5 rotating continuously while the first external cable 21 for the signal A is disconnected.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A diagnosing method for an abnormal cable connection of an incremental encoder, incorporated with a motor driver connected with the incremental encoder and a motor, the motor driver at least comprising a micro control unit (MCU) comprising a first encoder module and a second encoder module, the incremental encoder outputting a signal A, a signal $\overline{A}$, a signal B, and a signal $\overline{B}$, wherein the signal $\overline{A}$ is a reverse signal of the signal A, the signal $\overline{B}$ is a reverse signal of the signal B, the diagnosing method comprising:

a) computing a first signal information group in accordance with a first set of differential signals by the first encoder module, wherein the first set of differential signals comprises one of the signal A and the signal $\overline{A}$ and one of the signal B and the signal $\overline{B}$, and the first signal information group comprises a first signal count and a first signal direction;

b) computing a second signal information group in accordance with a second set of differential signals by the second encoder module, wherein the second set of differential signals comprises one of the signal A and the signal $\overline{A}$ and one of the signal B and the signal $\overline{B}$, and the second signal information group comprises a second signal count and a second signal direction;

c) computing a first parameter information group based on the first signal information group and computing a second parameter information group based on the second signal information group by the MCU, wherein the first parameter information group comprises a first signal rotating speed, a first signal angle, and the first signal direction, the second parameter information group comprises a second signal rotating speed, a second signal angle, and the second signal direction;

d) determining, by the MCU, whether the first signal direction is consistent with the second signal direction, determining, by the MCU, that multiple external cables connected between the incremental encoder and the motor driver are normal when the first signal direction is consistent with the second signal direction, and computing, by the MCU, a position-feedback control parameter of the motor in accordance with the first signal information group generated based on the first set of differential signals or the second signal information group generated based on the second set of differential signals; and e) executing following steps, by the MCU, when the first signal direction is inconsistent with the second signal direction:

e1) computing a first signal acceleration in accordance with the first signal rotating speed and determining whether the first signal acceleration is greater than an acceleration threshold, determining that at least one signal of the first set of differential signals received by the first encoder module is abnormal and computing the position-feedback control parameter of the motor in accordance with the second signal information group generated based on the second set of differential signals when the first signal acceleration is greater than the acceleration threshold;

e2) computing a second signal acceleration in accordance with the second signal rotating speed and determining whether the second signal acceleration is greater than the acceleration threshold, determining that at least one signal of the second set of differential signals received by the second encoder module is abnormal and computing the position-feedback control parameter of the motor in accordance with the first signal information group generated based on the first set of differential signals when the second signal acceleration is greater than the acceleration threshold; and e3) determining that a situation of an abnormal speed-feedback signal occurs and terminating a diagnosis when the first signal direction is inconsistent with the second signal direction, the first signal acceleration is equal to or less than the acceleration threshold, and the second signal acceleration is equal to or less than the acceleration threshold.

2. The diagnosing method in claim 1, wherein the step e1) comprises computing the first signal acceleration through a first formula, and the step e2) comprises computing the second signal acceleration through a second formula, wherein the first formula is: $|\omega_1(k)-\omega_1(k-1)/t(k)-t(k-1)|$, the second formula is: $|\omega_2(k)-\omega_2(k-1)/t(k)-t(k-1)|$, wherein $\omega_1$ is the first signal rotating speed, $\omega_2$ is the second signal rotating speed, $t(k-1)$ is a first sampling time, and $t(k)$ is a second sampling time.

3. The diagnosing method in claim 1, wherein the acceleration threshold is: $|T_{max}/J|$, wherein $T_{max}$ is a maximum torque of the motor, and J is a total inertia received by the motor.

4. The diagnosing method in claim 1, wherein the step d) comprises:

d1) determining whether the first signal angle is consistent with the second signal angle when the first signal direction is consistent with the second signal direction;

d2) computing the position-feedback control parameter of the motor in accordance with the first signal information group generated based on the first set of differential signals or the second signal information group generated based on the second set of differential signals when the first signal angle is consistent with the second signal angle; and d3) determining that a situation of the abnormal cable connection or an abnormal signal occurs when the first signal angle is inconsistent with the second signal angle.

5. The diagnosing method in claim 4, wherein the step d1) comprises determining that the first signal angle is inconsistent with the second signal angle when an angle difference between the first signal angle and the second signal angle is greater than or equal to an angle error threshold, and determining that the first signal angle is consistent with the second signal angle when the angle different is less than the angle error threshold, wherein the angle error threshold is computed based on a range of 10% to a torque error of the motor.

6. The diagnosing method in claim 4, wherein the step d3) comprises:

d31) computing a first signal acceleration in accordance with the first signal rotating speed and determining whether the first signal acceleration is greater than an acceleration threshold when a direction of the first signal angle is inconsistent with a direction of the second signal angle, and determining that at least one signal of the first set of differential signals received by the first encoder module is abnormal and computing the position-feedback control parameter of the motor in accordance with the second signal information group generated based on the second set of differential signals when the first signal acceleration is greater than the acceleration threshold;

d32) computing a second signal acceleration in accordance with the second signal rotating speed, determining whether the second signal acceleration is greater than the acceleration threshold, and determining that at least one signal of the second set of differential signals received by the second encoder module is abnormal and computing the position-feedback control parameter of the motor in accordance with the first signal information group generated based on the first set of differential signals when the second signal acceleration is greater than the acceleration threshold; and d33) determining that a situation of an abnormal speed-feedback signal occurs and terminating a diagnosis when the first signal angle is inconsistent with the second signal angle, the first signal acceleration is equal to or less than the acceleration threshold, and the second signal acceleration is equal to or less than the acceleration threshold.

7. The diagnosing method in claim 6, wherein the step d31) comprises computing the first signal acceleration through a first formula, and the step d32) comprises computing the second signal acceleration through a second formula, wherein the first formula is: $|\omega_1(k)-\omega_1(k-1)/t(k)-t(k-1)|$, the second formula is: $|\omega_2(k)-\omega_2(k-1)/t(k)-t(k-1)|$, wherein the acceleration threshold is: $|T_{max}/J|$, $\omega_1$ is the first signal rotating speed, $\omega_2$ is the second signal rotating speed, $t(k-1)$ is a first sampling time, $t(k)$ is a second sampling time, $T_{max}$ is a maximum torque of the motor, and J is a total inertia received by the motor.

8. A diagnosing device for an abnormal cable connection of an incremental encoder, the diagnosing device at least comprising a motor driver connected with the incremental encoder and a motor, the motor driver comprising a micro control unit (MCU), the incremental encoder outputting a signal A, a signal $\overline{A}$, a signal B, and a signal $\overline{B}$, and the incremental encoder providing the signal A, the signal $\overline{A}$, the signal B, and the signal $\overline{B}$ to the motor driver through a first path, a second path, a third path and a fourth path in the motor driver, wherein a first resistor is connected between the first path and the second path, a second resistor is connected between the third path and the fourth path, the signal $\overline{A}$ is a reverse signal of the signal A, the signal $\overline{B}$ is a reverse signal of the signal B, and the MCU comprises:

a first encoder module, comprising two inputs respectively connected with the first path and the third path, and computing a first signal information group in accordance with a first set of differential signals, wherein the first set of differential signals comprises one of the signal A and the signal $\overline{A}$ and one of the signal B and the signal $\overline{B}$ received through the first path and the third path, and the first signal information group comprises a first signal count and a first signal direction;

a second encoder module, comprising two inputs respectively connected with the second path and the fourth path, and computing a second signal information group in accordance with a second set of differential signals, wherein the second set of differential signals comprises one of the signal A and the signal $\overline{A}$ and one of the signal B and the signal $\overline{B}$ received through the second path and the fourth path, and the second signal information group comprises a second signal count and a second signal direction; and a diagnosing unit, receiving the first signal information group from an output of the first encoder module and receiving the second signal information group from an output of the second encoder module, wherein the diagnosing unit is configured to compute a first parameter information group based on the first signal information group and compute a second parameter information group based on the second signal information group, wherein the first parameter information group comprises a first signal rotating speed, a first signal angle, and the first signal direction, the second parameter information group comprises a second signal rotating speed, a second signal angle, and the second signal direction;

wherein, the diagnosing unit is configured to determine that at least one of multiple external cables connected between the incremental encoder and the motor driver is abnormal or determine that a situation of an abnormal speed-feedback signal occurs to the motor in accordance with the first parameter information group and the second parameter information group, and the diagnosing unit is configured to compute a position-feedback control parameter of the motor in accordance with the first signal information group generated based on the first set of differential signals or the second signal information group generated based on the second set of differential signals transmitted through a normal one of the multiple external cables.

9. The diagnosing device in claim 8, wherein the abnormal cable connection to the external cables comprises a disconnection, a short circuit, or a signal interference, wherein a signal phase of a signal of the first set of differential signals and the second set of differential signals is changed correspondingly when one of the external cables is disconnected, a signal of the first set of differential signals and the second set of differential signals is abnormal correspondingly when one of the external cables is short-circuited, and a signal of the first set of differential signals and the second set of differential signals is temporarily abnormal correspondingly when one of the external cables is interfered.

10. The diagnosing device in claim 8, wherein when one of the external cables connected with the first path is abnormal, the signal $\overline{A}$ is further provided to the first encoder module through the first resistor along the first path;

when one of the external cables connected with the second path is abnormal, the signal A is further provided to the second encoder module through the first resistor along the second path;

when one of the external cables connected with the third path is abnormal, the signal $\overline{B}$ is further provided to the first encoder module through the second resistor along the third path; and when one of the external cables connected with the fourth path is abnormal, the signal B is further provided to the second encoder module through the second resistor along the fourth path.

* * * * *